United States Patent
Iacona

(10) Patent No.: US 7,640,668 B2
(45) Date of Patent: Jan. 5, 2010

(54) QUICK LOADING CUTTING HEAD FOR A ROTARY TRIMMER

(75) Inventor: Fernando R. Iacona, Paradise Valley, AZ (US)

(73) Assignee: Kwik Products, Inc., Phoenix, AZ (US)

( * ) Notice: Subject to any disclaimer, the term of this patent is extended or adjusted under 35 U.S.C. 154(b) by 359 days.

(21) Appl. No.: 11/633,321

(22) Filed: Dec. 4, 2006

(65) Prior Publication Data

US 2007/0130781 A1 Jun. 14, 2007

Related U.S. Application Data

(60) Provisional application No. 60/748,757, filed on Dec. 8, 2005, provisional application No. 60/755,532, filed on Dec. 29, 2005.

(51) Int. Cl.
 *B26B 7/00* (2006.01)
(52) U.S. Cl. ...................................................... 30/276
(58) Field of Classification Search ........... 30/276–277; 56/12.7, 17; D8/8
 See application file for complete search history.

(56) References Cited

U.S. PATENT DOCUMENTS

| | | | |
|---|---|---|---|
| 3,826,068 A | | 7/1974 | Ballas et al. |
| 4,020,552 A | | 5/1977 | Mizuno et al. |
| 4,097,991 A | | 7/1978 | Proulx |
| 4,134,204 A | | 1/1979 | Perdue |
| 4,259,782 A | | 4/1981 | Proulx |
| 4,738,085 A | * | 4/1988 | Nishio et al. ................. 56/12.7 |
| 4,882,843 A | * | 11/1989 | Baba ........................... 30/276 |
| 5,339,526 A | * | 8/1994 | Everts ......................... 30/276 |
| 5,623,765 A | * | 4/1997 | Ner-Gaon ..................... 30/276 |
| 5,671,536 A | * | 9/1997 | Everts et al. .................. 30/276 |
| 5,806,192 A | * | 9/1998 | Everts et al. .................. 30/276 |
| 5,890,352 A | * | 4/1999 | Molina ......................... 56/12.7 |
| 6,148,523 A | * | 11/2000 | Everts et al. .................. 30/276 |
| D465,975 S | * | 11/2002 | Iacona ........................... D8/8 |
| D479,961 S | * | 9/2003 | Iacona ........................... D8/8 |
| 6,735,874 B2 | * | 5/2004 | Iacona ........................... 30/276 |
| 6,754,964 B2 | * | 6/2004 | Sugihara et al. ................ 30/276 |
| D496,840 S | * | 10/2004 | Iacona ........................... D8/8 |
| 6,851,191 B2 | * | 2/2005 | Arnetoli ........................ 30/276 |

(Continued)

FOREIGN PATENT DOCUMENTS

EP   1795062 A2 *  6/2007

(Continued)

*Primary Examiner*—Jason Daniel Prone
(74) *Attorney, Agent, or Firm*—Anthony J. Casella; Gerald E. Hespos

(57) ABSTRACT

A cutting head for a rotary trimmer is provided. The cutting head of the present disclosure provides a control mechanism for loading a spool member of the cutting head quickly and efficiently without having to disassemble the cutting head. In one embodiment, a control mechanism is provided in the cutting head interacting between a follower member and a spool member so as to provide for one way rotational loading of flails, e.g., cutting line, into the cutting head; in other words, to load the flails, the spool member is rotated continuously 360° in one direction only, e.g., clockwise. In another embodiment, a cutting head allows the flails to be loaded by a ratcheting-type operation, i.e., a back and forth rotational movement, which is less fatiguing and even more efficient in its loading operation.

6 Claims, 10 Drawing Sheets

U.S. PATENT DOCUMENTS

| | | | |
|---|---|---|---|
| 6,901,667 B2* | 6/2005 | Proulx | 30/276 |
| 6,925,718 B2* | 8/2005 | Bartmann et al. | 30/276 |
| 6,952,877 B2 | 10/2005 | Pfaltzgraff | |
| D532,263 S * | 11/2006 | Iacona | D8/8 |
| 7,257,898 B2* | 8/2007 | Iacona | 30/276 |
| 7,275,324 B2* | 10/2007 | Proulx | 30/276 |
| 7,513,046 B2* | 4/2009 | Proulx | 30/276 |
| 7,520,060 B2* | 4/2009 | Jesse | 30/276 |
| 7,581,322 B2* | 9/2009 | Proulx | 30/276 |
| 2003/0226261 A1* | 12/2003 | Iacona | 30/276 |
| 2005/0072007 A1* | 4/2005 | Proulx | 30/276 |
| 2005/0076515 A1* | 4/2005 | Proulx | 30/276 |
| 2005/0217120 A1* | 10/2005 | Proulx | 30/276 |
| 2007/0180706 A1* | 8/2007 | Guerra | 30/276 |
| 2008/0010836 A1* | 1/2008 | Iacona | 30/347 |
| 2008/0052917 A1* | 3/2008 | Proulx | 30/276 |
| 2008/0116218 A1* | 5/2008 | Iacona | 225/46 |
| 2008/0127496 A1* | 6/2008 | Proulx | 30/276 |
| 2008/0168664 A1* | 7/2008 | Iacona | 30/276 |
| 2009/0172955 A1* | 7/2009 | Morris et al. | 30/276 |
| 2009/0223065 A1* | 9/2009 | Proulx | 30/276 |
| 2009/0260237 A1* | 10/2009 | Alliss | 30/276 |

FOREIGN PATENT DOCUMENTS

WO     WO 97/29627     8/1997

* cited by examiner

QUICK LOADING CUTTING HEAD FOR A ROTARY TRIMMER

PRIORITY

This application claims priority to an application entitled "QUICK LOADING CUTTING HEAD FOR A ROTARY TRIMMER" filed in the United States Patent and Trademark Office on Dec. 8, 2005 and assigned Ser. No. 60/748,757, and an application entitled "RATCHET-TYPE, QUICK LOADING CUTTING HEAD FOR A ROTARY TRIMMER" filed in the United States Patent and Trademark Office on Dec. 29, 2005 and assigned Ser. No. 60/755,532, the contents of which are hereby incorporated by reference.

BACKGROUND

1. Field

The present disclosure relates to cutting heads for rotary trimmers and, more specifically, it relates to an improved cutting head for rotary trimmers using continuous lengths of spooled monofilament strings as a means for cutting vegetation. The present disclosure represents an improvement over presently existing cutting head designs and allows for quick, smooth, ratchet-type efficient loading of the monofilament strings onto the spool of a cutting head.

2. Description of the Related Art

Flail feedout means for mowing and trimming devices used to trim grass, weeds, and other vegetation, of the rotary type equipped with flexible cord-like flails formed of generally cylindrical fibers, are well known in the art. Grass and weed cutters of this general type are widely known and the subject of various patented devices including those described in Ballas et al., U.S. Pat. No. 3,826,068; Mizuno et al., U.S. Pat. No. 4,020,552; Prouix, U.S. Pat. No. 4,097,991; Perdue, U.S. Pat. No. 4,134,204; Toro, Belgium Patent No. 852,150; and Prouix, U.S. Pat. No. 4,259,782. Such devices are available on the market having automatic flail feedout mechanisms which respond to a bump on the ground intentionally applied by the operator or by the application of force applied thereto by some mechanical arrangement.

An improved flail feedout mechanism for a rotary mower is disclosed in the above-mentioned U.S. Pat. No. 4,259,782, the disclosure of which is incorporated herein by reference. However, the specific construction of the tangs and the serpentinous cam slot in that device is designed to result in stress concentrations in the engaging members and, as a result, an abrupt and discontinuous operation of the feedout assembly occurs which results in potential wear of the assembly parts, as well as non-smooth operation of the mowing device.

Applicant is the inventor of U.S. Pat. No. 6,735,874 B2 which issued on May 18, 2004 and is entitled "Cutting Head for a Rotary Trimmer". U.S. Pat. No. 6,735,874 is incorporated in its entirety herein and basically discloses a handle with an attached drive means that is connected to a spinning housing. The housing has a spool containing one or more coils of string used as filaments for cutting vegetation. A pair of orifices is oppositely positioned on the spool for guiding the exposed filament to the proper cutting position.

The feed-out assembly of U.S. Pat. No. 6,735,874 is disclosed in detail in said patent and operates smoothly so that its performance does not degrade with use. Also, the assembly operates in a smooth and consistent manner, without resulting in stress concentrations on individual parts forming the feed-out assembly, as was the shortcoming in the prior art.

Although the cutting head disclosed in U.S. Pat. No. 6,735,874 operates in an efficient and smooth manner, a need exists for a cutting head that can be quickly and easily loaded with a length of flail. A further need exists for a cutting head for a rotary trimmer that can be loaded without requiring disassembly of the cutting head.

SUMMARY

An improved cutting head which may be more quickly and easily loaded with predetermined lengths of flail without requiring disassembly of the cutting head is provided. In one embodiment, a control mechanism is provided in the cutting head interacting between a follower member and a spool member so as to provide for one way rotational loading of the flails into the cutting head; in other words, to load the flails, the spool member is rotated continuously 360° in one direction only, e.g., clockwise. In another embodiment, a cutting head allows the flails to be loaded by a ratcheting-type operation, i.e., a back and forth rotational movement, which is less fatiguing and even more efficient in its loading operation.

According to one aspect of the present disclosure, a cutting head for a rotary trimmer having two diametrically opposed cutting flails which extend outwardly from a spinning housing having an axis of rotation, a bumper for engagement with the ground and means to allow predetermined lengths of flail to feed outwardly in response to the striking of the bumper on the ground is provided including a cam member having a serpentinous cam slot being defined by radially extending tangs which are radially spaced, with alternate tangs being spaced along said axis of rotation so as to define said serpentinous cam slot; a follower member disposed over the cam member and having at least two diametrically opposed tangs extending radially inwardly of said follower member positioned to ride in said cam slot and a plurality of ribs disposed on a lower circumferential surface; a cylindrical spool member configured for supporting at least one flail, the cam member and follower member being disposed in the spool member and the spool member including a plurality of ramps disposed along a peripheral inner surface corresponding to the plurality of ribs disposed on the lower circumferential surface of the follower member; and biasing means acting between the cam member and the follower member tending to urge the cam follower into stable positions on said cam slot when undisturbed by force applied to said bumper and adapted to be overcome by suitable force applied to said bumper, the cam slot being generally parallel to the force applied by said biasing means, wherein upon loading the at least one flail, the spool member is rotated in one direction along the axis of rotation and the follower member is fixed due to the interaction with the cam member.

In another aspect, the spool member further includes a channel for receiving the at least one flail. The channel extends approximately 180 degrees around an inner peripheral surface of the spool member.

In further aspect of the present disclosure, the spool member further includes a channel extending therethrough having an insert orifice for receiving the at least one flail and a exit orifice for threading the at least one flail through the spool member, wherein the spool member further includes at least two slots for winding the at least one flail about the spool member and each orifice is configured to direct the at least one flail into one of the at least two slots.

According to another aspect of the present disclosure, a cutting head for a rotary trimmer having two diametrically opposed cutting flails which extend outwardly from a spinning housing having an axis of rotation, a bumper for engagement with the ground and means to allow predetermined lengths of flail to feed outwardly in response to the striking of the bumper on the ground is provided including a spool member configured for supporting at least one flail; and a ratchet mechanism extending from the housing configured to rotate the spool member in one direction along the axis of rotation while loading the at least one flail.

In further aspect, the spool member further includes a cylindrical wall with an end closure wall disposed on a lower end of the cylindrical wall, the end closure wall including a plurality of ribs disposed annularly about the end closure wall; and the ratchet mechanism includes an end cap disposed about the lower end of the spool member, the end cap including a plurality of ramps disposed along a peripheral inner surface corresponding to the plurality of ribs of the spool member, wherein upon applying a back and forth rotational movement to end cap causes the spool member to rotate in one direction.

BREIF DESCRIPTION OF THE DRAWINGS

The above and other aspects, features, and advantages of the present disclosure will become more apparent in light of the following detailed description when taken in conjunction with the accompanying drawings in which:

FIG. 1 is an exploded perspective view of the flail feed-out assembly of U.S. Pat. No. 6,735,874;

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

A cutting head for a rotary trimmer configured to facilitate loading of at least one cutting line, e.g., flail, is provided. Generally, a rotary trimmer includes a hollow handle with an attached drive means that is connected to a spinning housing, e.g., a cutting head. The housing has a spool member containing one or more coils of string used as filaments for cutting vegetation. A pair of orifices is oppositely positioned on the spool member for guiding the exposed filament to the proper cutting position.

Figure 1:
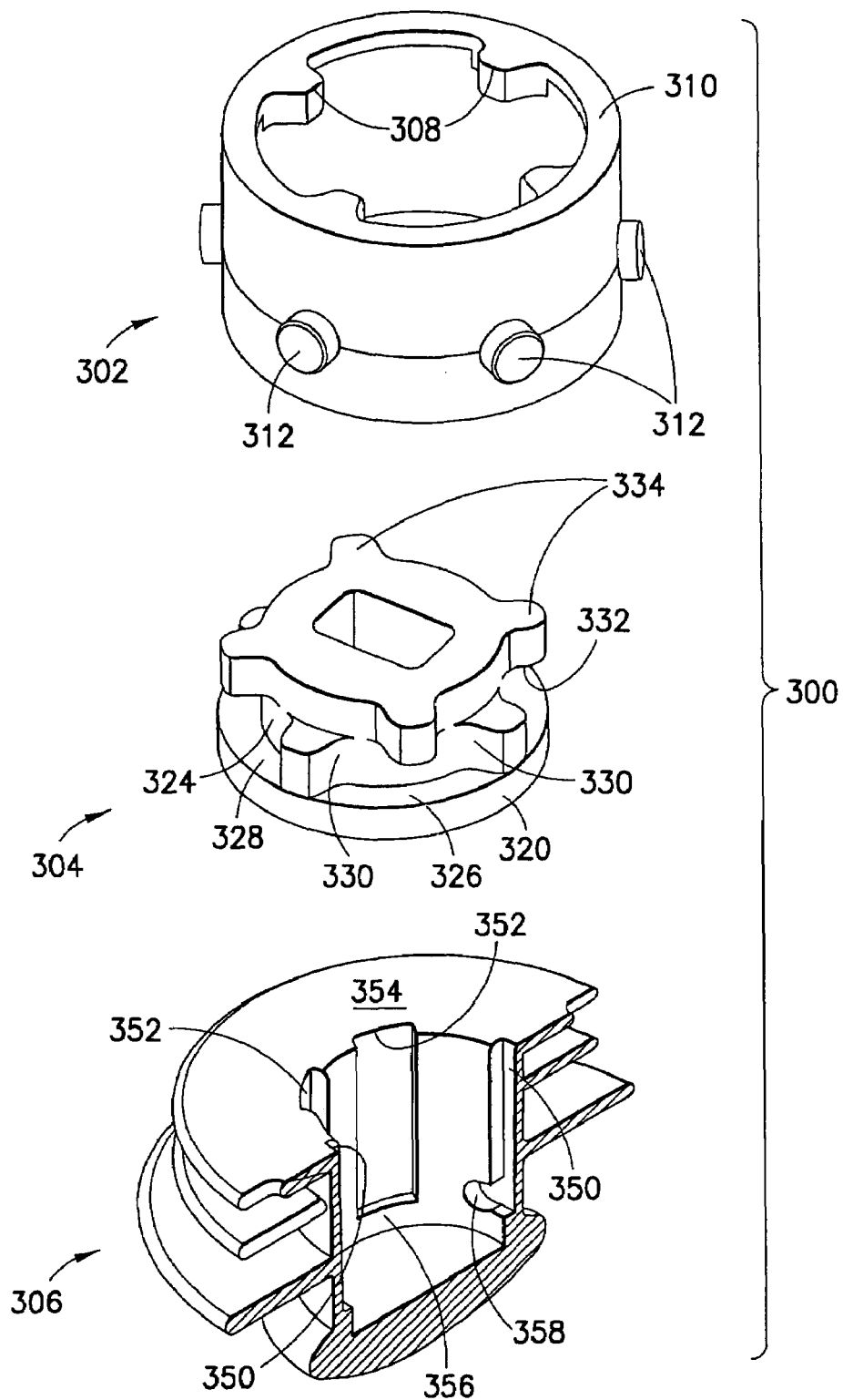

Turning to FIG. 1, the flail feed-out assembly of U.S. Pat. No. 6,735,874 is employed in the cutting head for a rotary trimmer of the present disclosure. The flail feed-out assembly 300 basically comprises a follower member 302, a cam member 304, and a spool member 306. The follower member 302 is of generally cylindrical configuration having four uniformly spaced, radially inwardly facing tangs 308 adjacent the upper surface 310 of the follower member 302. Projecting radially outwardly of the follower member 302, and uniformly spaced, are six knobs, each designated by the numeral 312. The knobs are disposed intermediate the side wall of the follower member 302, with each knob 312 being of cylindrical configuration and with the knobs being uniformly spaced in a radial direction at an angle of 60 degrees relative to each other.

The cam member 304 has a lower, annular plate 320 of a diameter slightly less than the inner diameter of the cylindrical follower member 302. Annular plate 320 includes a central hole. Formed integral with the plate 320, and formed adjacent the upper surface of the cam member 304, is a serpentinous cam groove 324. The latter has radially oriented lower surfaces 326, 328 and vertical abutment portions 330 disposed at about 90 degrees to the lower surfaces 326, 328. The upper surface 332 of the cam groove 324 is formed by a plurality of radially outwardly oriented tangs 334 so that the serpentinous path of the cam groove 324 jogs at right angles.

As shown in FIG. 1, the follower tangs 308 are restricted to motion within the cam groove 324. The tangs 308 move from one adjacent vertical surface 330 to the next facing in the same direction. The tangs 334 include sidewardly facing planar abutment surfaces which assist in reducing the hammering pressures when the tangs 308 move from an abutment with one vertical surface 330 to the next.

The spool member 306 includes six grooves 350, 352 in its inner cylindrical surface 356. The grooves 350 are diametrically opposed and axially aligned within the spool member 306 down to a radially oriented abutment in cylindrical surface 356 and having lateral cut-outs 358 adjacent thereto. The grooves 350 receive two outwardly extending, diametrically opposed knobs which slide therealong and lock the follower member 302 to which the knobs 312 are mounted to rotate with the spool member 306. The grooves 352 also extend from the top surface 354 of the spool member 306 down to the radially oriented abutment in cylindrical surface 356, with the width of each groove 352 corresponding to the maximum width of the grooves 350, including the lateral cut-outs 358.

Accordingly, in the locked position of the follower member 302 in the spool member 306, each of the six knobs 312 bears against a side wall of the respective grooves 350, 352, thereby providing enhanced structural contact between the follower member 302 and the spool member 306 so as to improve the efficiency and smoothness of operation of the flail feed-out assembly 300.

As noted above, although the cutting head of applicant's U.S. Pat. No. 6,735,874 operates in a smooth and efficient manner, it is desirable for the cutting head to be capable of rapidly loading the lengths of flail into the cutting head in an efficient and easy manner, and without disassembly of the cutting head.

Figure 2A:
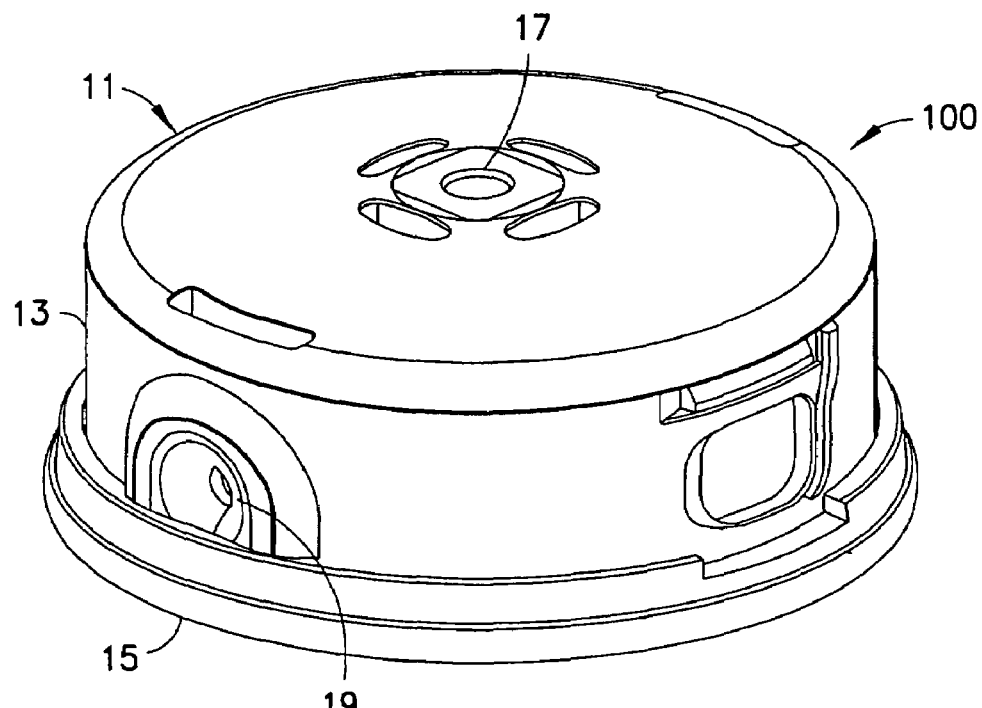
FIG. 2A is a perspective top view of a cutting head in accordance with the present disclosure.
Figure 2B:
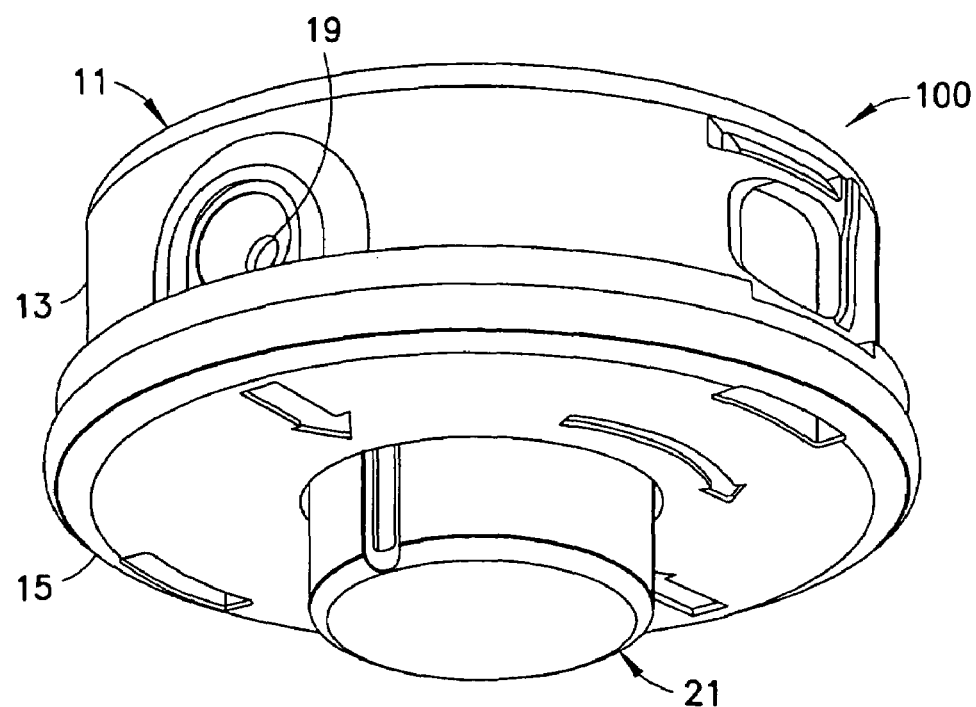
FIG. 2B is a perspective bottom view of a cutting head in accordance with the present disclosure.

An improved cutting head 100 for a rotary trimmer is provided. The cutting head of the present disclosure provides a control mechanism for loading a spool member of the cutting head quickly and efficiently without having to disassemble the cutting head. Referring to FIGS. 2A and 2B, a perspective top and bottom view of a cutting head in accordance with the present disclosure is illustrated respectively. Generally, the cutting head 100 includes a generally cylindrical housing 11. The housing 11 includes an upper housing 13 and a lower housing 15. On the upper housing 13, a coupling 17 is provided to couple the cutting head 100 to a drive means of a trimmer as is known in the art. The upper housing 13 further includes at least two diametrically opposed orifices 19, e.g., eyelets, for enabling flail to extended from the spool member disposed in the housing 11.

Referring to FIG. 2B, a control mechanism 21 is provided which extends beyond the lower housing 15. As will be described in detail below, the control mechanism will serve two functions. The control mechanism 21 will cause the flail disposed in the housing 11 to extend through the eyelets 19 when the control mechanism 21 is bumped on a surface. This function is described in detail in the above-mentioned U.S. Pat. No. 6,735,874. The control mechanism 21 will also be employed to load the flail into the cutting head 100. In operation, a length of flail is inserted into eyelet 19 and the control mechanism 21 is rotated to cause the flail to be wrapped around the spool member disposed in the housing 11.

Figure 3:
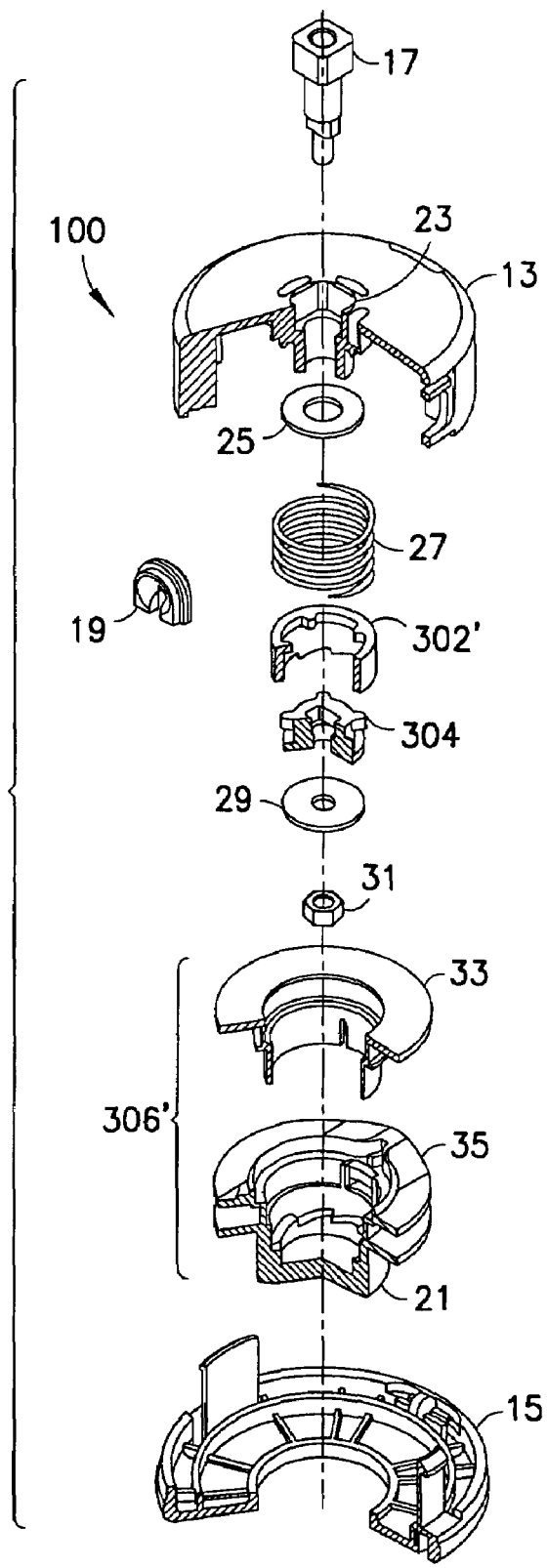
FIG. 3 is an exploded perspective view of a cutting head in accordance with the present disclosure.

Referring to FIG. 3, an exploded perspective view of a cutting head in accordance with the present disclosure is illustrated. The cutting head 100 generally includes housing 11 including upper housing 13 and lower housing 15. Coupler 17 is disposed in an aperture 23 of the upper housing 13. The coupler 17 is illustrated as a square head bolt but may take other forms. It is to be appreciated that when assembled the coupler 17 will provide a driving force to the cutting head 100 from a drive means of the trimmer. Disposed on the drive bolt coupler 17 is a first washer 25, biasing means 27, e.g., a spring, a follower member 302', the cam member 304, a second washer 29 and a fastening means 31, e.g., a threaded nut. The biasing means 27 will urge the follower member 302' into stable positions on the cam slot of the cam member 304 when undisturbed by force applied to the bumper or control mechanism 21. The cutting head 100 further includes a spool member 306' for supporting the flail. The assembled portion of the follower member 302' and the cam member 304 are disposed in the spool member 306' and the lower housing 15 is disposed about the lower portion of the spool member 35 and coupled to the upper housing 13 to complete the cutting head 100.

The cutting head of the present disclosure has been designed to include a feed-out assembly which eliminates the six knobs 312 from the follower member 302, as well as the grooves 350, 352 from the spool member 306 as described in U.S. Pat. No. 6,735,874. In one embodiment, the cutting head of the present disclosure provides for a control mechanism interacting between the follower member and the spool member so as to provide for only one way rotational loading (e.g., clockwise) of the flails into the cutting head. It should also be noted that the cam member 304 of U.S. Pat. No. 6,735,874 is of identical construction to the cam member forming a portion of the present disclosure. Furthermore, like numbers in FIGS. 4-7 correspond to identical structure described and depicted in FIG. 4 of U.S. Pat. No. 6,735,874 and illustrated in FIG. 1.

Figure 4:
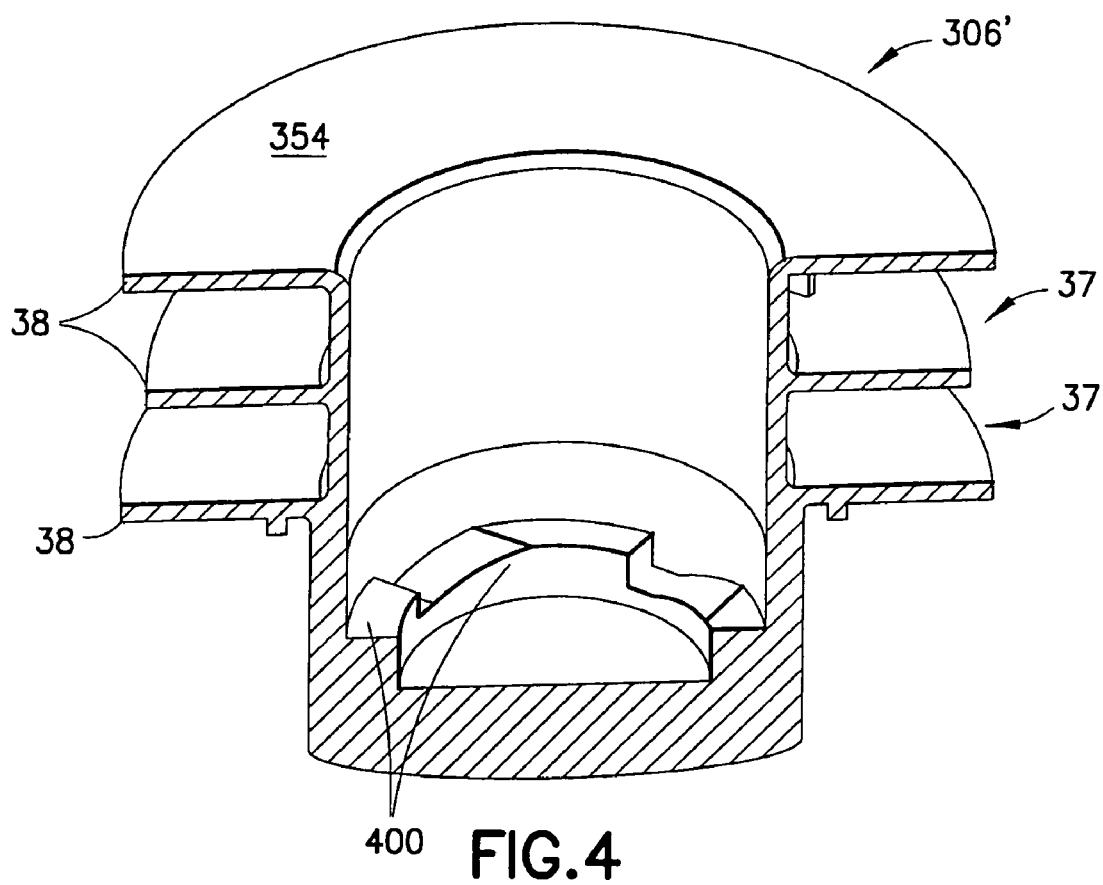
FIG. 4 is a perspective, cross-sectional view of a spool member according to an embodiment of the present disclosure.
Figure 5:
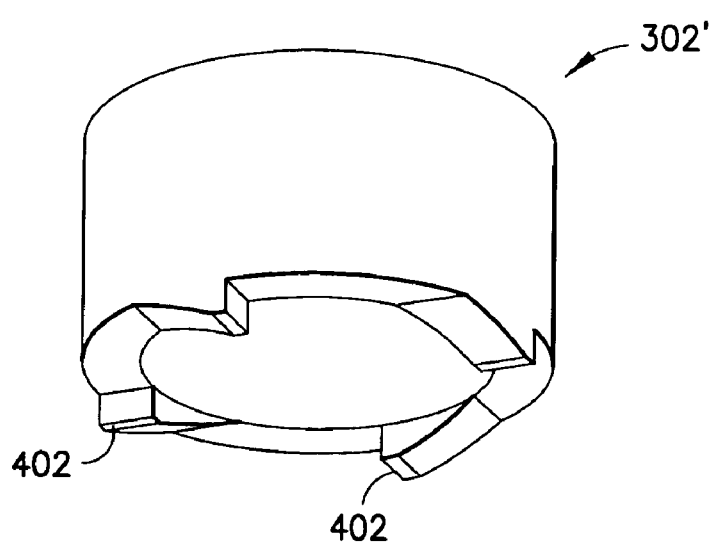
FIG. 5 is a perspective view of a follower member according to an embodiment of the present disclosure.
Figure 6:
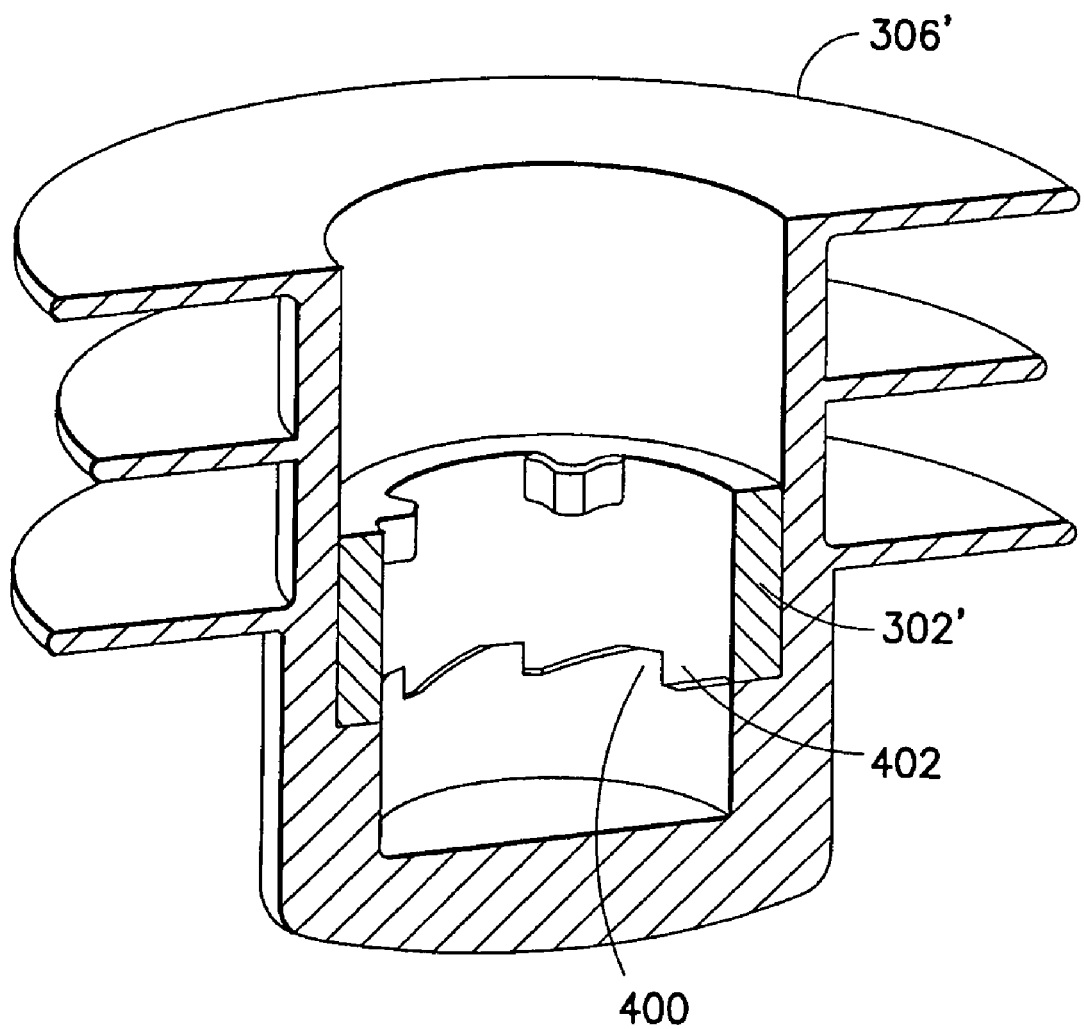
FIG. 6 is a perspective, cross-sectional view illustrating the assembly of the follower member within the spool member of FIG. 4.

Turning to FIGS. 4-6, the spool member 306' includes a series of ramps 400 disposed along the peripheral inner surface of the spool member 306'. The spool member 306' further includes at least one slot 37 for winding the flail about the spool member 306'. A plurality of flanges 38 are provided on an upper portion of the spool member 306' for retaining the flail within the slots 37. A corresponding series of ribs 402 are provided on the lower circumferential surface of the cylindrical follower member 302'. The series of ramps 400 are substantially of the same size and shape, e.g., generally triangular, as the series of ribs 402 so when at rest the series of ribs 402 will mate with the series of ramps 400.

The interengagement of the ramps 400 of the spool member 306' and the ribs 402 of the follower member 302' is depicted in FIG. 6. By virtue of the interaction of said ramps and ribs, the spool member 306' may only be rotated in one direction, i.e., clockwise, since the follower member 302' is fixed within the cutting head by virtue of its attachment to the cam member 304.

Figure 7:
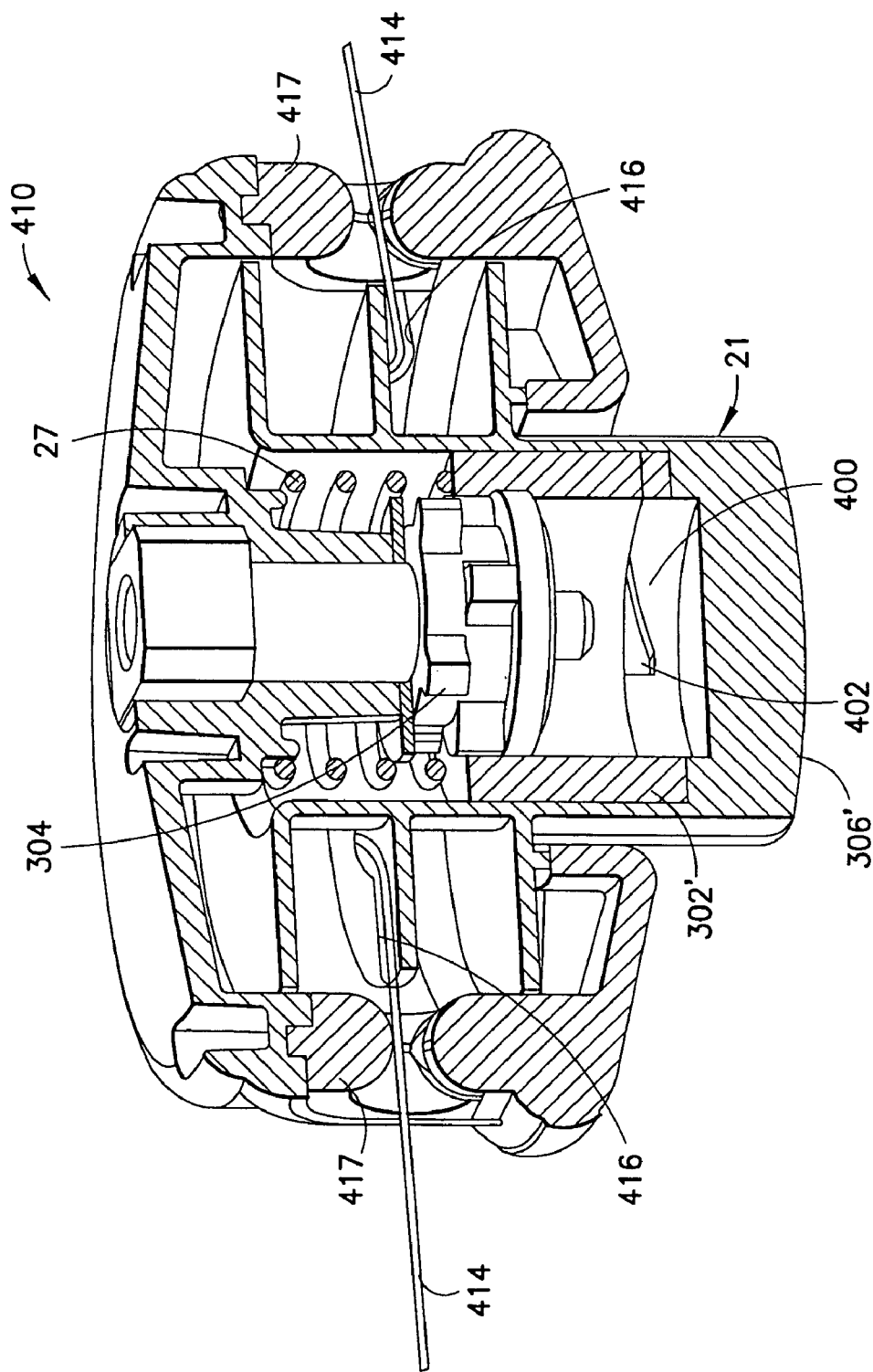
FIG. 7 is a perspective, cross-sectional view of the cutting head in accordance with the present disclosure.

FIG. 7 is a perspective view of a cross-section of a cutting head 410 employing the components shown in FIGS. 4-6. As shown in FIG. 7, eyelets 417, 417 are disposed on diametrically opposite sides of the cutting head 410, with each eyelet being aligned with one of the spaced slots 37 within the spool member 306'. To load the cutting head 410, an end of a length of flail or string 414 is inserted in each eyelet 417 until it engages a retaining member 416, after which the spool member 306', i.e., the control mechanism extending from lower housing 15, may be rotated in a clockwise direction until the spool member is fully loaded with the two lengths of string 414, and sufficient string extends outside the cutting head for the vegetation cutting operation. When loading, the spool member 306' is rotated to wind the length of flail in at least one of the slots 37. When rotating the spool member 306', the series of ramps 400 will cause the series of ribs 402 of the follower member 302' to ride up in a vertical direction against the biasing force of the spring 27. After a predetermined rotation is imparted to the spool member 306', the ribs 402 will engage subsequent ramps 400. Due to the structure of the ribs 402 and ramps 400, the spool member 306' will only rotate in one direction and will not travel in an opposite direction possibly causing unspooling of the flail.

It is noted that the tap-and-go feature of U.S. Pat. No. 6,735,874 is retained in the cutting head 410 by virtue of the interaction of the follower member 302' and the cam member 304. Furthermore, the cutting head 410 does not require disassembly to restring the spool member 306'.

Figure 8A:
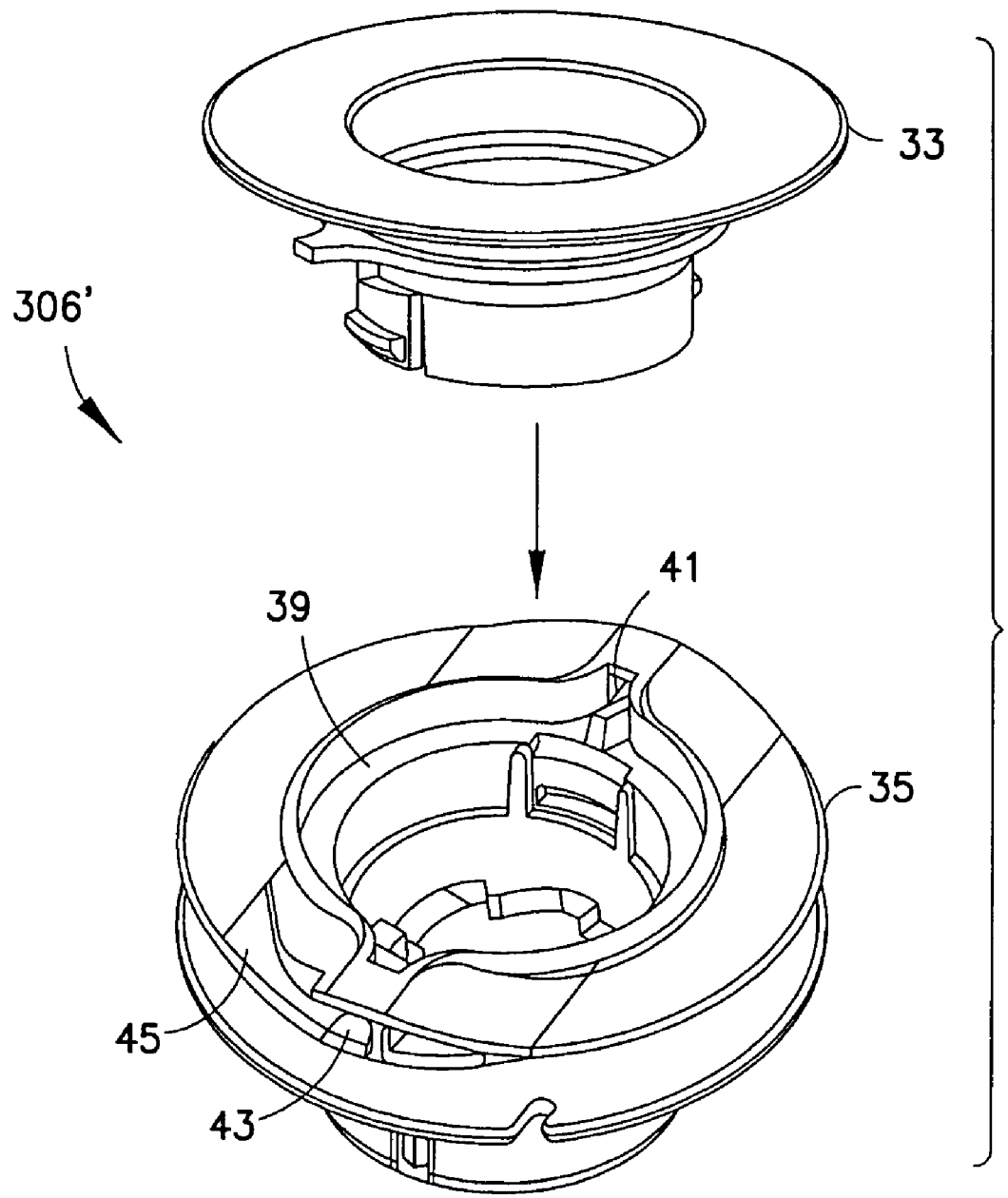
FIG. 8A is another embodiment of a spool member for a cutting head in accordance with the present disclosure.
Figure 8B:
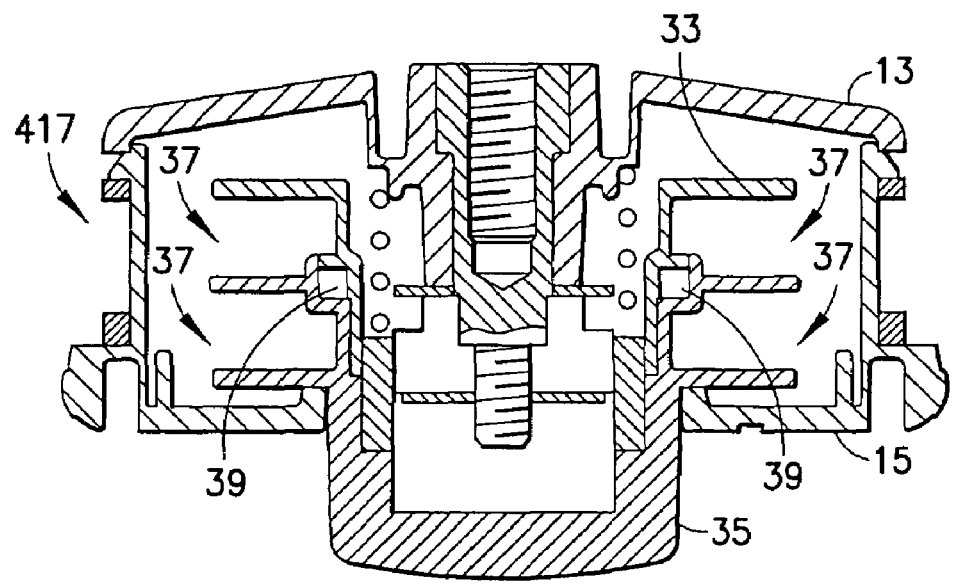
FIG. 8B is a cross-sectional view of a cutting head employing the spool member shown in FIG. 8A.
Figure 8C:
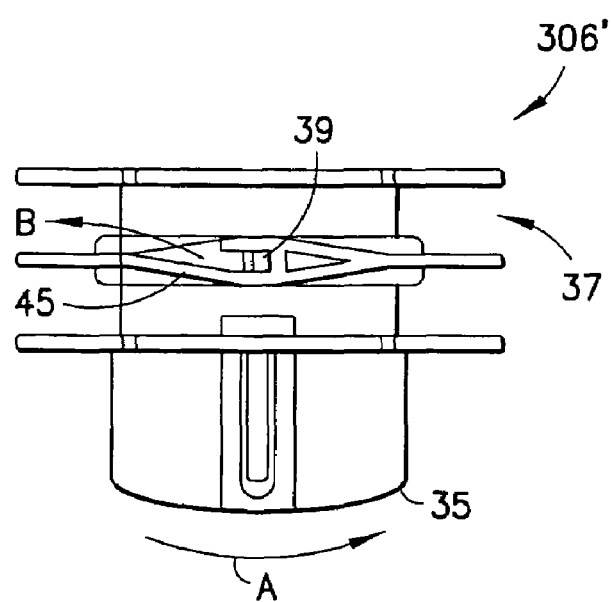
FIG. 8C is a side view of the spool member shown in FIG. 8A.

Referring to FIG. 8A, another embodiment of the spool member 306' is provided. In this embodiment, the spool member 306' includes an upper spool portion 33 and a lower spool portion 35. The lower spool portion 35 includes a channel that extends approximately 180 degrees around an inner peripheral surface of the spool member. When the upper spool portion 33 is coupled to the lower spool portion 35, the channel 39 will retain the flail as shown in FIG. 8B. The channel 39 includes an insert orifice 41 for receiving the at least one flail and an exit orifice 43 for threading the at least one flail through the spool member. When loading the cutting head 100, the lower spool portion 35 is rotated until the insert orifice 41 and exit orifice 43 align with the eyelets 417 (see FIG. 7) of the upper housing 13. A length of flail is then inserted into the insert orifice 41 via an eyelet 417 until it exits from the exit orifice 43 and eyelet 417 on the opposite side. The flail can then be pulled through the channel 39 until an equal length of flail extends from both sides of the cutting head. As the lower spool portion 35 is rotated, a ramp 45 located near each orifice 41, 43 will cause each end of the flail to be wound around different slots 37 of the spool member 306'. For example, referring to FIG. 8C, as the lower spool portion 35 is rotated in the direction of arrow A, ramp 45 will cause a length of flail to ride up the ramp 45 as indicated by arrow B and to be wrap around the upper slot 37. Similarly, a downward sloping ramp is disposed near the insert orifice 41 to cause the length of flail extending therefrom to be wrapped around the lower slot 37.

Referring to FIGS. 9A through 11, another embodiment of the cutting head in accordance with the present disclosure is provided. Only the components different than the above-described embodiments will be described below. The components of this embodiment enable the cutting head to operate in an efficient and smooth manner and include the further improvement in the cutting head which allows the flails to be loaded by a ratcheting-type operation, that is, a back and forth rotational operation, which is less fatiguing to the individual loading the cutting head and is more efficient in the loading operation.

Figure 9A:
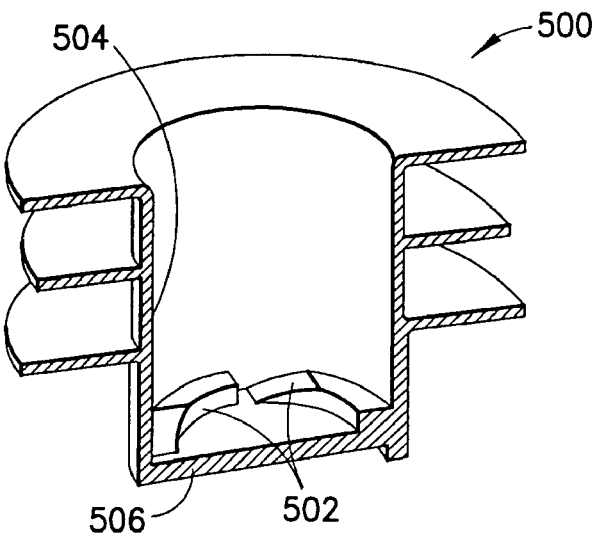
FIG. 9A is a perspective, cross-sectional view of a spool member according to a further embodiment of the present disclosure.
Figure 9B:
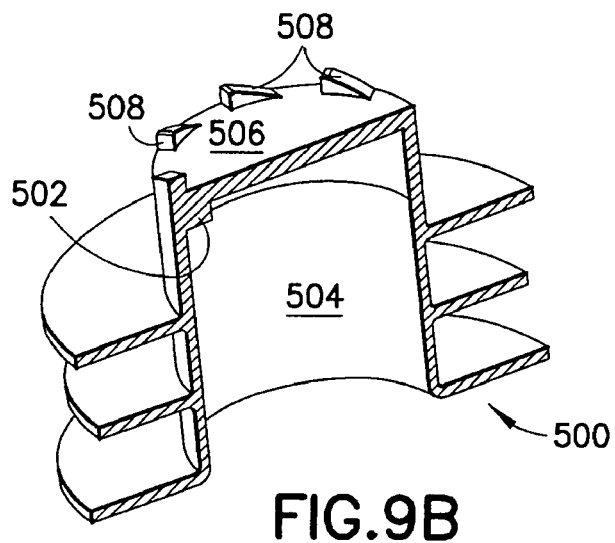
FIG. 9B is a perspective, cross-sectional view of the spool member of FIG. 9A in an inverted position.
Figure 9C:
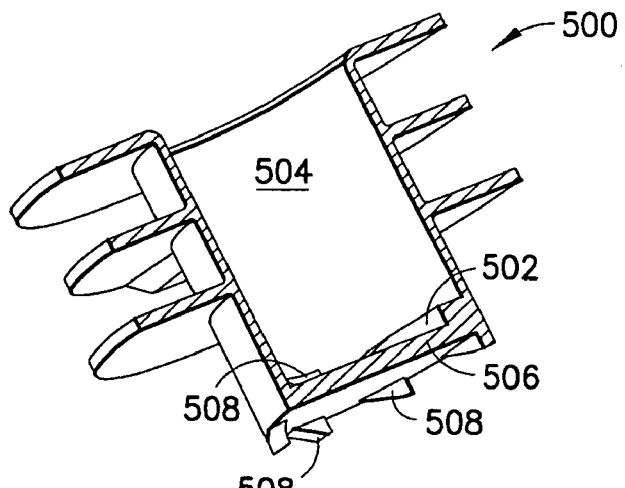
FIG. 9C is another perspective, cross-sectional view of the spool member of FIGS. 9A and 9B.

The spool member 500 of this embodiment is illustrated in FIGS. 9A, 9B and 9C. Spool member 500 includes a cylindrical wall 504 as well as an end closure wall 506 which is integrally formed with a plurality of ramps 502.

As illustrated in FIGS. 9B and 9C, on the opposite or external portion of the end closure wall 506 of the spool member 500 are a series of triangular-shaped ribs 508. The latter are uniformly spaced about the periphery of the annular end closure wall 506, so as to be radially disposed at an acute angle as, for example, between 15 degrees and 60 degrees.

Figure 10:
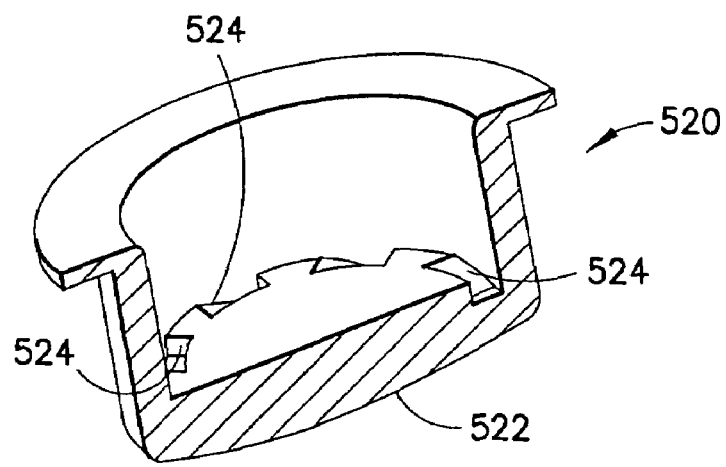
FIG. 10 is a perspective, cross-sectional view of a control end cap forming a portion of the cutting head of the present disclosure.

In the above-described embodiments, the end closure wall of the spool member would be exposed from the lower end of the cutting head and would be the surface which would be contacted by the cutting head during a tap-and-go operation and rotated for loading a predetermined length of flail. In this embodiment, the lower portion of the cylindrical wall 504 of the spool member 500 is disposed within an end cap 520, as illustrated in FIG. 10. The end cap 520 is of cylindrical configuration, with an end closure wall 522, and internally of the end cap 520 are a series of ramps 524. The ramps 524 correspond in number, spacing and shape to the triangular-shaped ribs 508 of the spool member 500.

The control mechanism is this embodiment is effectuated by the interaction of the spool member 500, end cap 520, the follower member 302' and cam member 304. The triangular-shaped ribs 508 cooperate with the ramps 524 of the end cap 520 to provide the ratchet-type, or back and forth rotational, movement of the end cap 520 relative to the spool member 500 during a loading operation of the flails within the cutting head. The disposition of the ribs 508 and the triangular-shaped ramps 524 enable the ratchet-type loading of the flails, and this is accomplished in clockwise rotary direction of movement of the spool member 500. The interaction between the ramps 502 of the spool member 500 and the follower member of the subject cutting head limits rotation of the spool member to a single direction, such as clockwise.

Figure 11:
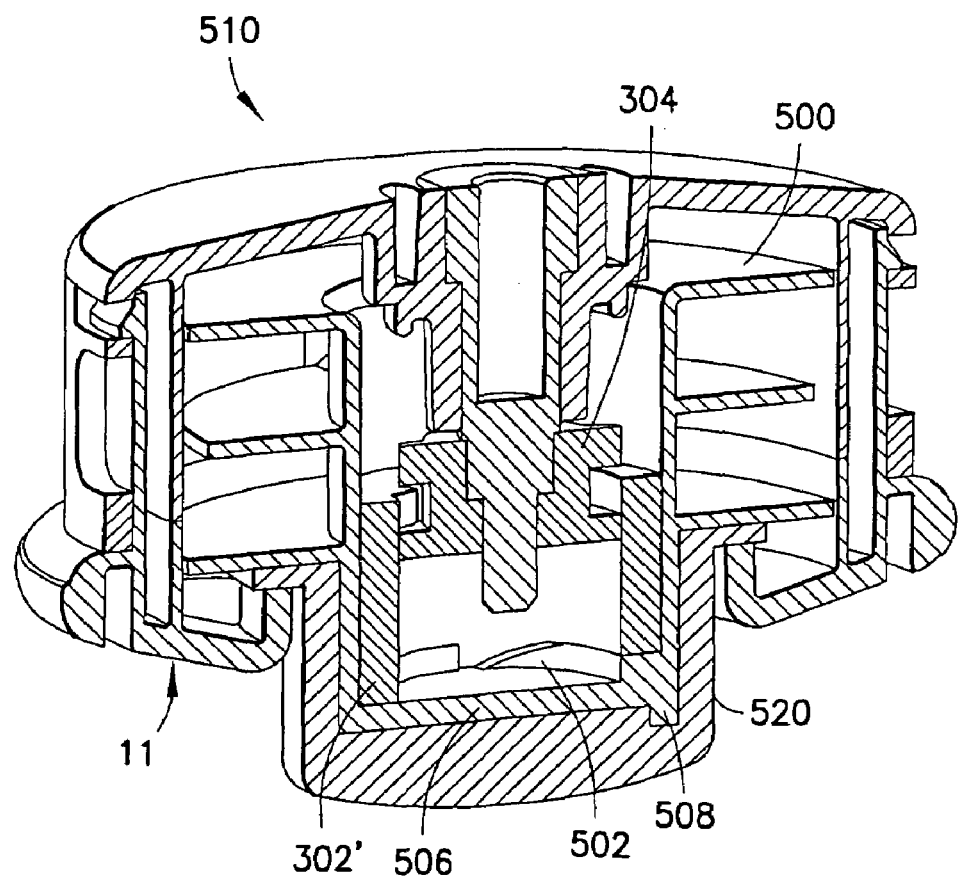
FIG. 11 is a perspective, cross-sectional view of a further embodiment of the cutting head of the present disclosure.

FIG. 11 illustrates a perspective, cross-sectional view of a new and improved cutting head 510 of the present disclosure including the components illustrated in FIGS. 9A-10. As will be noted, the spool member 500 is received within the end cap 520. In turn, the end cap 520 is rotatably mounted within the housing 11, with the spring (not shown) of the cutting head providing intimate contact between the various components of the subject cutting head. As end cap 520 is ratcheted back and forth, the spool member 500 rotates in one direction to load the flail.

The new and improved cutting head of the present embodiment as illustrated in FIGS. 9A-11 provides a new and improved cutting head which operates in an efficient and smooth manner and which allows the flails to be loaded by a ratcheting-type operation, which is less fatiguing to the user and more efficient in its loading operation.

Many changes, modifications, variations, and other uses and applications of the present disclosure will, however, become apparent to those skilled in the art after considering the foregoing specification together with the accompanying drawings. All such changes, modifications, variations, and other uses and applications which do not depart from the spirit and scope of the present disclosure are deemed to be covered by the present disclosure.

What is claimed is:

1. A cutting head for a rotary trimmer comprising:

two diametrically opposed cutting flails which extend outwardly from a spinning, generally cylindrical housing having an axis of rotation;

a bumper for engagement with the ground;

means to allow predetermined lengths of flail to feed outwardly in response to the engagement of the bumper on the ground;

a cam member having a first and second set of radially spaced radially extending tangs, wherein the first set of tangs is spaced along said axis of rotation from the second set of said tangs to define a serpentinous cam slot;

a generally cylindrical follower member disposed over the cam member and having at least two diametrically opposed tangs extending radially inwardly adjacent an upper surface of said generally cylindrical follower member positioned to ride in said cam slot of the cam member, the generally cylindrical follower member including a plurality of ribs disposed on a lower circumferential surface;

a spool member having a generally cylindrical body including a plurality of flanges on an upper portion of the generally cylindrical body configured for supporting each of said cutting flails and a lower portion of the generally cylindrical body configured as the bumper, the upper portion of the spool member being disposed in the housing and the lower portion extending through an opening in the housing, the cam member and the generally cylindrical follower member being disposed in the spool member and the spool member including a plurality of ramps disposed along a peripheral inner surface of the generally cylindrical body corresponding to the plurality of ribs disposed on the lower circumferential surface of the generally cylindrical follower member; and a biasing means acting on the generally cylindrical follower member to urge the generally cylindrical follower member into stable positions on said cam slot of the cam member and into engagement with the spool member when undisturbed by a force applied to said bumper by said biasing means, and adapted to be overcome by a suitable force applied to said bumper, the cam slot being generally parallel to the force applied by said biasing means, wherein upon loading the two cutting flails, the spool member is rotated via the bumper in one direction along the axis of rotation and the generally cylindrical follower member is fixed due to the interaction with the cam member preventing the spool member from traveling in an opposite direction.

2. The cutting head as in claim 1, wherein the spool member further includes two channels, each channel for receiving one of said two diametrically opposed cutting flails.

3. The cutting head as in claim 2, wherein each channel extends approximately 180 degrees around an inner peripheral surface of the spool member.

4. The cutting head as in claim 1, wherein the spool member further includes two channels extending therethrough, each channel having an insert orifice for receiving one of said two diametrically opposed cutting flails and an exit orifice for threading the one of said two cutting flails through the spool member.

5. The cutting head as in claim 4, wherein the spool member further includes two slots for winding the two diametrically opposed cutting flails about the spool member and each orifice is configured to direct one of said two diametrically opposed cutting flails into one of the two slots.

6. The cutting head as in claim 1, wherein the plurality of ramps of the spool member and the plurality of ribs of the generally cylindrical follower member are substantially triangular.

* * * * *